United States Patent
Zhang

(10) Patent No.: US 12,147,465 B2
(45) Date of Patent: Nov. 19, 2024

(54) QUESTION-ANSWER PROCESSING METHOD, APPARATUS, ELECTRONIC DEVICE AND COMPUTER-READABLE STORAGE MEDIUM

(71) Applicant: BOE Technology Group Co., Ltd., Beijing (CN)

(72) Inventor: Zhenzhong Zhang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/754,418

(22) PCT Filed: Apr. 29, 2021

(86) PCT No.: PCT/CN2021/090925
§ 371 (c)(1),
(2) Date: Mar. 31, 2022

(87) PCT Pub. No.: WO2022/226879
PCT Pub. Date: Nov. 3, 2022

(65) Prior Publication Data
US 2024/0119080 A1    Apr. 11, 2024

(51) Int. Cl.
*G06F 16/33* (2019.01)
*G06F 16/332* (2019.01)
*G06F 16/383* (2019.01)

(52) U.S. Cl.
CPC ........ *G06F 16/383* (2019.01); *G06F 16/3329* (2019.01); *G06F 16/3347* (2019.01)

(58) Field of Classification Search
CPC ............. G06F 16/3863; G06F 16/3347; G06F 16/3329
See application file for complete search history.

(56) References Cited

U.S. PATENT DOCUMENTS

| | | | |
|---|---|---|---|
| 2016/0267382 A1 | 9/2016 | Sullivan | |
| 2019/0188271 A1 | 6/2019 | Murdock et al. | |
| 2022/0318311 A1* | 10/2022 | Wang | G06N 20/00 |

FOREIGN PATENT DOCUMENTS

| | | |
|---|---|---|
| CN | 108491433 A | 9/2018 |
| CN | 108920654 A | 11/2018 |
| CN | 109033244 A | 12/2018 |
| CN | 111310848 A | 6/2020 |
| CN | 111353033 A | 6/2020 |
| CN | 111538824 A | 8/2020 |
| CN | 112347760 A | 2/2021 |

* cited by examiner

*Primary Examiner* — Baoquoc N To
(74) *Attorney, Agent, or Firm* — Intellectual Valley Law, P.C.

(57) ABSTRACT

A question-answer processing method, apparatus, electronic device, and computer-readable storage medium are provided. A question-answer processing method includes the following steps: acquiring an input question and a candidate question-answer pair, where the candidate question-answer pair comprises a candidate question and a candidate answer matching the candidate question; inputting the input question into a first model to obtain an input question vector; calculating a similarity between the input question vector and a candidate question vector, and calculating a relevance between the input question vector and a candidate answer vector; and determining a matching degree of the candidate answer and the input question according to the similarity and the relevance.

18 Claims, 3 Drawing Sheets

QUESTION-ANSWER PROCESSING METHOD, APPARATUS, ELECTRONIC DEVICE AND COMPUTER-READABLE STORAGE MEDIUM

CROSS-REFERENCE TO RELATED APPLICATION

This application is a national stage application under 35 U.S.C. § 371 of International Application No. PCT/CN2021/090925, filed Apr. 29, 2021, the contents of which are incorporated by reference in the entirety.

TECHNICAL FIELD

The present disclosure relates to the field of computer technology, and more particularly, to a question-answer processing method, apparatus, electronic device and computer-readable storage medium.

BACKGROUND

An intelligent question-answer refers to, based on a question raised by a user, by matching with an existing question and answer, giving an answer matched with the question raised by the user, and giving a corresponding question answer based on the question raised by the user, which can be applied to various fields to reduce the need for human resources and improve the convenience of information acquisition by the user.

SUMMARY

Some embodiments of the present disclosure provide a question-answer processing method, including the following steps:
- acquiring an input question and a candidate question-answer pair, where the candidate question-answer pair comprises a candidate question and a candidate answer matching the candidate question;
- inputting the input question into a first model to obtain an input question vector;
- calculating a similarity between the input question vector and a candidate question vector, and calculating a relevance between the input question vector and a candidate answer vector; and
- determining a matching degree of the candidate answer and the input question according to the similarity and the relevance.

In some embodiments, the calculating the similarity between the input question vector and the candidate question vector includes:
- calculating the similarity between the input question vector and the candidate question vector by a formula 1, where the formula 1 is:

$$sim(vq, vq1) = \frac{vq^T \cdot vq1}{|vq| \times |vq1|},$$

sim(vq, vq1) is the similarity, vq is the input question vector, vq1 is the candidate question vector, $vq^T \cdot vq1$ is a transpose of the input question vector and a dot product of the candidate question vector, |va| is a length of the input question vector, and |vq1| is the length of the candidate question vector.

In some embodiments, the calculating the relevance between the input question vector and the candidate answer vector comprises:
- calculating the relevance between the input question vector and the candidate answer vector by a formula 2, wherein the formula 2 is:

$$rel(vq, va) = \frac{vq^T \cdot va}{|vq| \times |va|},$$

rel(vq, va) is the relevance, vq is the input question vector, va is the candidate answer vector, $vq^T \cdot va$ is the transpose of the input question vector and the dot product of the candidate question vector, |vq| is the length of the input question vector, |va| is the length of the candidate answer vector.

In some embodiments, prior to the calculating the similarity between the input question vector and the candidate question vector, and calculating the relevance between the input question vector and the candidate answer vector, further including:
- inputting the candidate question into a second model to obtain the candidate question vector, and inputting the candidate answer into a third model to obtain the candidate answer vector, wherein the first model, second model and third model are obtained by means of joint training.

In some embodiments, after the acquiring the input question and the candidate question-answer pair further includes:
- inputting the input question, the candidate question and the candidate answer into a shared language model respectively to obtain text vectors respectively corresponding to the input question, the candidate question and the candidate answer;
- inputting the input question into the first model, including:
- inputting a text vector corresponding to the input question into the first model;
- inputting the candidate question into the second model, including:
- inputting the text vector corresponding to the candidate question into the second model; and
- inputting the candidate answer into the third model, including:
- inputting the text vector corresponding to the candidate answer into the third model.

In some embodiments, at least one of the first model, the second model, and the third model is a neural network model.

In some embodiments, the shared language model is a Bert model.

In some embodiments, the method further includes:
- acquiring the first model, the second model, and the third model by joint training; and
- a loss function of the joint training being:

loss=$(y_{rel}$-rel(vq,va)$)^2$+$(y_{sim}$-sim(vq,vq1)$)^2$;

where loss is a loss value, $y_{rel}$ is a preset relevance label, $y_{sim}$ is a preset similarity label, rel(vq, va) is the relevance between the input question vector and the candidate answer vector, and sim(vq, vq1) is the similarity between the input question vector and the candidate question vector.

In some embodiments, the determining the matching degree of the candidate answer and the input question according to the similarity and the relevance includes:

calculating the matching degree of the candidate answer and the input question by a formula 3, where the formula 3 is: score=λ×sim+(1−λ)×relλ; score is the matching degree, sim is the similarity, rel is the relevance, and λ is a preset coefficient more than 0 and less than 1.

In some embodiments, after the determining the matching degree of the candidate answer and the input question according to the similarity and the relevance, further includes:

outputting the candidate answer of which the matching degree with the input question is more than a preset matching degree threshold.

Some embodiments of the present disclosure provide a question-answer processing apparatus, including:

an acquisition module configured to acquire the input question and the candidate question-answer pair, where the candidate question-answer pair comprises the candidate question and the candidate answer matching the candidate question;

an input module configured to input the input question into the first model to obtain the input question vector, inputting the candidate question into the second model to obtain the candidate question vector, and inputting the candidate answer into the third model to obtain the candidate answer vector, where the first model, second model and third model are obtained by means of joint training;

a calculation module configured to calculate the similarity between the input question vector and the candidate question vector, and calculating the relevance between the input question vector and the candidate answer vector; and a matching degree determination module configured to determine the matching degree of the candidate answer and the input question according to the similarity and the relevance.

Some embodiments of the present disclosure provide an electronic device, including a processor, a memory and a computer program stored on the memory and executable on the processor, and when executed by the processor the computer program performs the steps of the question-answer processing method according to some aspects of the present disclosure.

Some embodiments of the present disclosure provide a computer-readable storage medium with the computer program stored thereon, and when executed by the processor, the computer program performs the steps of the question-answer processing method according to some aspects of the present disclosure.

BRIEF DESCRIPTION OF THE DRAWINGS

In order to more clearly illustrate the technical solutions of the embodiments of the present disclosure, a brief description will be given below with reference to the accompanying drawings which are required to be used in the description of the embodiments of the present disclosure. Obviously, the drawings in the following description are only some embodiments of the present disclosure, and for the ordinary skilled in the art, they can also obtain other drawings according to these drawings without involving any inventive effort.

DETAILED DESCRIPTION

The technical solutions in the embodiments of the present disclosure will be clearly and completely described below in combination with the accompanying drawings in the embodiments of the present disclosure. It is to be understood that the present disclosure is intended to be illustrative of the embodiments of the present disclosure, and is not intended to be exhaustive of the embodiments of the present disclosure. Based on the embodiments in the present disclosure, all other embodiments obtained by the ordinary skilled in the art without inventive effort fall within the scope of the present disclosure.

In the related art, the best answer in the knowledge base is often found only by the similarity between questions, however, this method cannot solve the synonym question. For example, the user's question is "what food can be eaten by diabetics", the stored question in the knowledge base is "diabetics' diet", and the word similarity of "what food can be eaten" and "diet" is 0, but the semantic similarity is high (namely, the relevant answer of "diabetics' diet" can answer the user's question "what food can be eaten by diabetics").

Some embodiments of the present disclosure provide a question-answer processing method. The execution subject of the method may be any electronic device, for example, it may be applied in an application with a question-answer function and may be executed by a server of the application or a terminal device. Optionally, the method may be executed by a server.

The technical solutions of the present embodiments are applied to intelligent question-answer, namely, feedbacking a corresponding answer for the user's question, and the technical solutions can be specifically applied to the question-answer of common questions in customer service and diseases, etc.

Illustratively, in the present embodiments, the technical solutions are applied to answers related to diabetes questions to provide some opinions or suggestions to the consultants.

Figure 1:
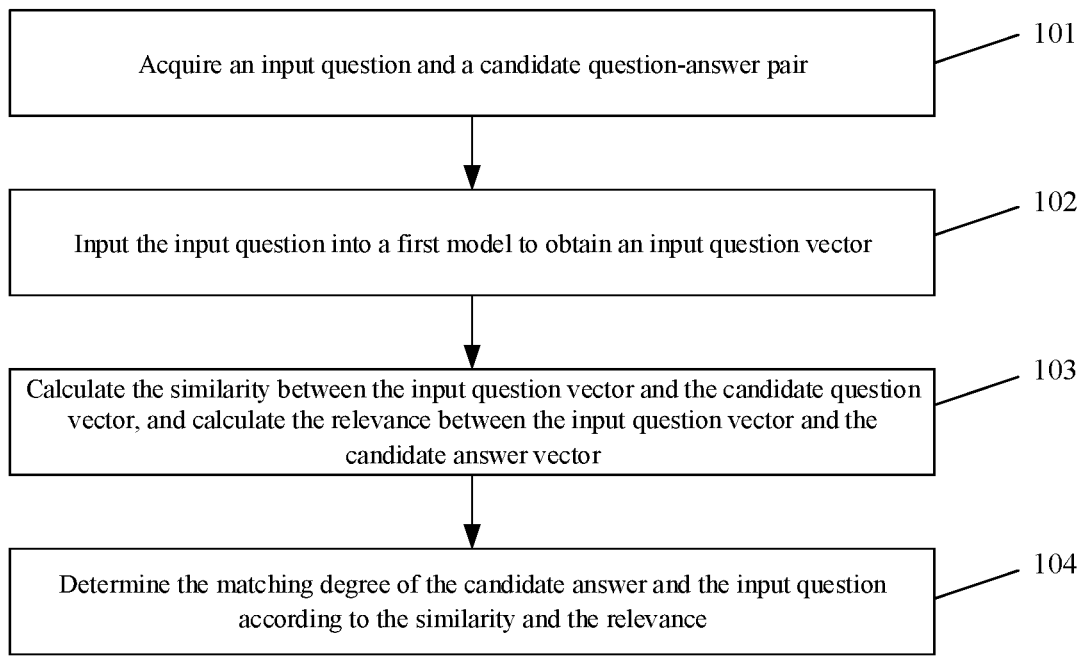
FIG. 1 is a flowchart of a question-answer processing method in some embodiments of the present disclosure.

As shown in FIG. 1, in some embodiments, the question-answer processing method includes the following steps.

At step 101: an input question and a candidate question-answer pair are acquired.

In some embodiments, the input question is a question that the user needs to ask and input, and the candidate question-answer pair includes a candidate question and a candidate answer matching the candidate question. The candidate question-answer pair can be, for example, a pre-established database including the question and the answer, for example, the candidate question-answer pair can be stored in the database. When applied to different scenarios, the candidate question-answer pair that matches the corresponding requirement can be set. For example, the user may be any user like any registered user of the application described above. For example, the above input question may be obtained by the terminal device receiving questions input by the user.

Illustratively, when the technical solutions are applied to answers related to diabetes questions, the database may include questions and professional responses to the questions by professionals, such as professional doctors.

For example, the candidate question-answer pair may include the question "diabetics' diet" and the corresponding answer "note for diabetics' diet: eat more high fiber food to promote the body's sugar metabolism, such as corn, cabbage, etc.", and may also include the question "Can food be cooked with vinegar for type 1 diabetes" and the corresponding answer "can".

At step 102: the input question is input into a first model to obtain an input question vector.

In some embodiments, the input question is input into the first model to obtain its corresponding input question vector.

In some embodiments, the method further includes: inputting the candidate question into a second model to obtain a candidate question vector, and inputting the candidate answer into a third model to obtain a candidate answer vector, where the first model, second model and third model are obtained by means of joint training.

It can be appreciated that in some of the embodiments, during execution, the input question, the candidate question, and the candidate answer may be input into the first model, the second model, and the third model respectively during every execution to acquire a corresponding input question vector, candidate question vector, and candidate answer vector respectively.

While in other embodiments, the candidate question and the candidate answer can be input into the second model and the third model respectively in advance to acquire the corresponding candidate question vector and candidate answer vector, and be saved. During execution, the input question is input into the first model, and the candidate question vector and the candidate answer vector saved in advance are called at the same time, so that the input question vector, the candidate question vector and the candidate answer vector can also be obtained.

The step of acquiring the input question vector, the candidate question vector and the candidate answer vector may be performed by a plurality of models, namely, the first model, the second model and the third model may be relatively independent models, and the step of acquiring the input question vector, the candidate question vector and the candidate answer vector may also be performed by one model, and it can be understood that the first model, the second model and the third model are three components of one integral model.

The parameters in the first model, the second model and the third model are obtained by means of joint training, that is, the three models are trained together and the parameters in every model are adjusted simultaneously, and in the process of parameter adjustment, the various models are not independent but interact with every other. For example, the three models may be the same type of model, for example, the three models may all be a deep neural network model, or may be at least partially different types of models, for example, the first model may be the deep neural network model, the second model may be a recurrent neural network model, and the third model may be a convolutional neural network model. There is no limitation.

Since the three models are obtained by means of joint training, the similarity between the input question and the candidate question, and the relevance between the input question and the candidate answer are considered so that the accuracy of determining the candidate answer matching the input question is improved. At the same time, duo to considering the connection between the similarity and the relevance, the number of parameters of the models is reduced.

In some embodiments, further including: inputting the input question, the candidate question and the candidate answer into a shared language model respectively to obtain text vectors respectively corresponding to the input question, the candidate question and the candidate answer.

In some embodiments, the dimensions of the text vectors corresponding to the input question, the candidate question and the candidate answer are all the same.

In some embodiments, the shared language model is used to convert the input content into the text vector, and then the corresponding input question vector, candidate question vector and candidate answer vector are generated based on the converted text vector.

In some embodiments, the text vectors corresponding to the input question, the candidate question and the candidate answer are all processed by the same shared language model. Through processing by the same shared language model, the number of models can be reduced and the complexity of the model can be reduced.

In some embodiments, the text vector corresponding to the input question is input into the first model; and the text vector corresponding to the candidate question is input into the second model; and the text vector corresponding to the candidate answer is input into the third model.

In some embodiments, the dimensions of the vectors output by the first model, the second model, and the third model are all equal.

For example, firstly the input question, the candidate question and the candidate answer are respectively converted into the corresponding text vectors with the same dimension by using the same shared language model, and then the text vectors are respectively converted into input question vector, candidate question vector and candidate answer vector with the same dimension by using the first model, the second model and the third model.

Since the obtained text vectors are obtained by converting the same shared language model and have the same dimension, the number of model parameters can be effectively reduced, and the input question vector, the candidate question vector and the candidate answer vector have the same dimension. Therefore, the text vectors can be mapped to the vector space with the same dimension to calculate, which is helpful to improve the subsequent processing effect and reduce the complexity of calculation.

Figure 2:
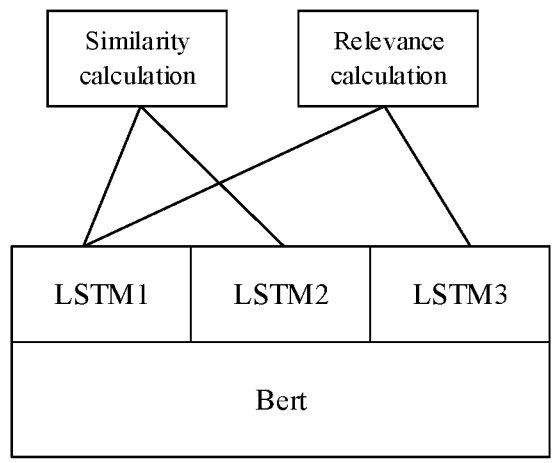
FIG. 2 is an architectural diagram of a model in some embodiments of the present disclosure.

The shared language model in the present embodiments may be selected from language processing models such as a Seq2Seq (a language model) model, a left-to-right (a language model) model, etc. As shown in FIG. 2, in some embodiments, the shared language model may be selected from a Bert (a language model) model. The Bert model has a better understanding of deep semantics, has a better effect on short text processing, so it can more quickly and accurately extract text vectors.

In some embodiments, at least one of the first model, the second model, and the third model is the neural network model. The first model, the second model, and the third model may be selected from an RNN (Recurrent Neural Network) model, a GRU (Gated Recurrent Neural Networks) model, an LSTM model (Long Short-Term Memory), etc. In some embodiments, the first model, the second model, and the third model may all be selected from the LSTM model, for example, the first model may be denoted as LSTM1, the second model as LSTM2, and the third model as LSTM3.

The LSTM model has the function of long-term memory and is easy to perform, which helps to reduce the system load and the difficulty of modeling. The first model, the second model and the third model can all be selected from an LSTM, and the input of feature vectors with the same specification and the output of vectors with the same specification can be performed. Thus, when the text vectors input to every model are obtained by using the shared language model, the processing is substantially the same, and when the output vectors of every model are processed, the processing is also performed on vectors with the same specification, and therefore, the processing is simpler and helps to further reduce the number of model parameters.

Figure 3:
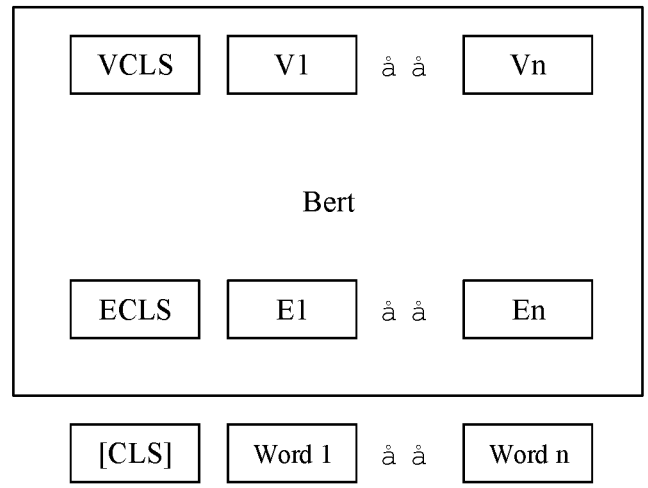
FIG. 3 is a schematic diagram of sharing a language model in some embodiments of the present disclosure.

The processing of the input question is illustrated as an example. As shown in FIG. 3, in the process of converting the input question into the corresponding text vector by using the Bert model, firstly, a marker symbol CLS required by the Bert model is added to the text head of the input question, and then the text including the marker symbol CLS is converted into a word vector. Specifically, the word vector obtained by the conversion includes a head vector ECLS corresponding to the marker symbol CLS and the word vector Ei (i=1, 2, 3, 4. N) corresponding to every word in the input question, where n is the total number of words in the input question, and i represents the ith word in the input question. The header vector ECLS and the word vector Ei are processed by the Bert model to generate the text vector V with a certain dimension, where the text vector V serves as an input of the first model, and the text vector V specifically includes a VCLS as a whole text representation and the vector Vi corresponding to every word (i=1, 2, 3, 4. N).

It should be appreciated that the above process of converting the text into the word vectors may be done through settling separately or adding specific processing module in a Bert-centric model.

The processes of candidate question and candidate answer may be referred to above, and will not be described in detail herein.

For example, in some embodiments, the dimension of the vector is 512-dimension, that is, every word is represented by using a 512-dimensional vector. For example, "Vi" represents a vector representation of "word i" through the Bert model, for example, the dimension is 512-dimension.

Next, the obtained text vector V is taken as the input of the LSTM model.

Figure 4:
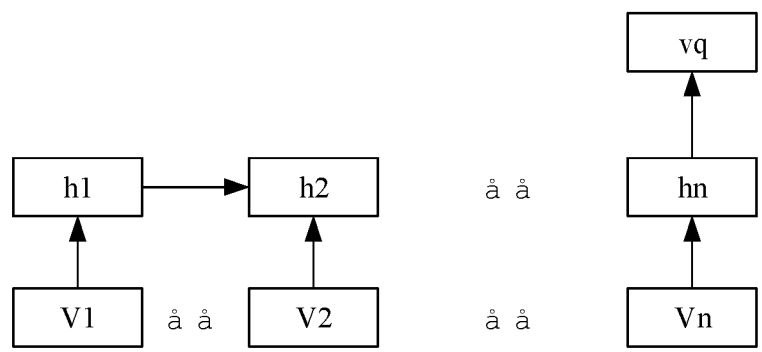
FIG. 4 is a schematic diagram of a first model in some embodiments of the present disclosure.

Still the input question is illustrated as an example. As shown in FIG. 4, hi is a hidden state of LSTM at the ith word (for example, when the text vector is a 512-dimensional vector, the vector dimension is 256), and the hidden state hi is determined according to the corresponding vector Vi of the current ith word and the hidden state hi-1 corresponding to the previous word, which can be written as: $h_i$=LSTM ($V_i$, $h_{i-1}$).

In some embodiments, after determining the hidden state hn of the last word of the n words included in the input text, the input question vector vq corresponding to the entire input question is calculated. Since the corresponding vector Vi of i words is determined with the hidden state hi-1 corresponding to the previous word, the hidden state hn of the last word actually includes all the information of the input text, thereby avoiding missing information and improving the accuracy of the calculation of the input question vector vq. Where vq=$W_1 \times h_n+b_1$, $W_1$ is a parameter matrix and is a bias vector. For example, $W_1$ is one of the parameters adjusted by the process of joint training.

In some embodiments, when the vector formed via the Bert model is represented as 512-dimension, the dimension of the vector is 128-dimension.

The dimensions of the input text, the hidden state and the finally obtained vector may be the same, or may be gradually reduced. The input question is illustrated as an example, and the input question may include more information which includes useful core information and a part of unimportant non-core information; therefore, the dimension of the text vector of the input question is relatively high.

In the processing, the input question vector vq is obtained by extracting the core information included in the neural network model. Compared with the text vector, the input question vector vq only including the core information includes relatively less information. Therefore, the input question vector can be represented by a low-dimensional vector, which helps to simplify the processing of parameters and reduce the occupation of storage space.

Similarly, the candidate question vector vq1 can be obtained by the second model, and the candidate answer vector va can be obtained by the third model.

In some embodiments, the candidate question vector vq1, the input question vector vq, and the candidate answer vector va are vectors of the same dimension. For example, the candidate question vector vq1, the input question vector vq, and the candidate answer vector va are column vectors.

At step 103: the similarity between the input question vector and the candidate question vector is calculated, and the relevance between the input question vector and the candidate answer vector is calculated.

In some of the embodiments, step 103 includes:

calculating the similarity between the input question vector and the candidate question vector by a formula 1, where the formula 1 is:

$$sim(vq, vq1) = \frac{vq^T \cdot vq1}{|vq| \times |vq1|},$$

sim(vq, vq1) is the similarity, vq is the input question vector, vq1 is the candidate question vector, $vq^T \cdot vq1$ is the transpose of the input question vector and the dot product of the candidate question vector, |vq| is a length of the input question vector, and |vq1| is the length of the candidate question vector.

In some embodiments, if one of vq and vq1 in the above formula is a row vector and the other is the column vector, the transpose step may be omitted and the dot product may be made directly. If both are row vectors or both are column vectors, one needs to be transposed and then made dot product with the other. Generally, the vector format output by the model is the column vector, that is, there is generally a transpose process.

In some of the embodiments, step 103 further includes:
calculating the relevance between the input question vector and the candidate answer vector by a formula 2, where the formula 2 is:

$$rel(vq, va) = \frac{vq^T \cdot va}{|vq| \times |va|},$$

rel(vq, va) is the relevance, vq is the input question vector, va is the candidate answer vector, $vq^T \cdot va$ is the transpose of the input question vector and the dot product of the candidate question vector, |vq| is the length of the input question vector, |va| is the length of the candidate answer vector.

In some embodiments, if one of vq and va in the above formula is the row vector and the other is the column vector, the transpose step may be omitted and the dot product may be made directly. If both are row vectors or both are column vectors, one needs to be transposed and then made dot product with the other. Generally, the vector format output by the model is the column vector, that is, there is generally a transpose process.

In some embodiments, the candidate question vector vq1, the input question vector vq, and the candidate answer vector va are column vectors, thus, in the above formula (1) and formula (2), in some embodiments, the first model can also be adjusted so that the input question vector vq output by the first model is the row vector, and at this time, the transpose of the input question vector can be replaced by the input question vector vq in the above formula, and the substantive calculation principle and calculation result thereof are the same as the above-mentioned process.

At step 104: the matching degree of the candidate answer and the input question is determined according to the similarity and the relevance.

In some embodiments, the step 104 includes:
calculating the matching degree of the candidate answer and the input question by a formula 3, where the formula 3 is: score=λ×sim (1−λ)×relλ; score is the matching degree, sim is the similarity, rel is the relevance, and λ is a preset coefficient more than 0 and less than 1.

In the technical solutions of the present embodiments, the formula 3 simultaneously considers the influence of the calculated similarity and relevance on the matching degree between the candidate answer and the input question. By adjusting the size of the preset coefficient A, the weight of the similarity and relevance can be adjusted, and the value of the preset coefficient λ can be set according to needs, for example, the preset system can be input via a user interaction interface, and the accuracy of the calculation of the matching degree between the candidate answer and the input question can be improved.

The step 104 may further include: outputting the candidate answer of which the matching degree with the input question is more than a preset matching degree threshold.

In the present embodiments, after inputting the matching degree between the question and every candidate answer, the candidate answer of which the matching degree is more than the preset matching degree threshold can further be output so that the user can understand the answer to the question.

The matching degree threshold in the present embodiments may be a score threshold value. Illustratively, the matching degree threshold is set to 90%, and in this case, the answer of the output candidate answers of which the matching degree with the input question is more than or equal to 90%, and in this case, the output answers may be one or more.

The matching degree threshold may also be a ranking threshold. Illustratively, the matching degree threshold is set to top 5, and after determining the matching degree between the candidate answer and the input question, the answers within the top 5 matching degree are output to provide the user with a plurality of answers for reference.

For example, the candidate answer matching the input question may be output via a human-computer interaction interface, or via a voice broadcast, etc.

Figure 5:
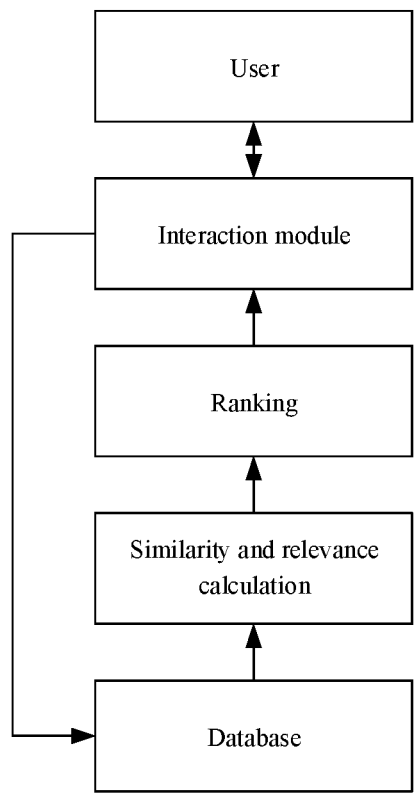
FIG. 5 is a schematic diagram of an implementation scenario of the question-answer processing method in some embodiments of the present disclosure.

As shown in FIG. 5, the technical solution of the present embodiments can be summarized as follows: firstly, the user inputs the wanted input question via an interaction module; next, according to the matching candidate questions and candidate answers pre-stored in the database, the similarity between the input question and the candidate question and the relevance between the input question and the candidate answer are calculated so as to determine the matching degree between the input question, the candidate question and the candidate answer, where there is a certain correspondence and association relationship between the candidate question and the candidate answer. Then, the candidate questions and the candidate answers are ranked according to the matching degree with the input question, and the candidate answer with the highest matching degree or several groups of candidate answers with higher matching degree are returned to the user through the interaction module, so that the settlement of the input question proposed by the user is completed.

In some embodiments, further including the step of acquiring the first model, the second model, and the third model by joint training.

In some embodiments, the method further includes:
acquiring the first model, the second model, and the third model by joint training.

In some embodiments, the first model is the neural network model taking the text vector of the input question as the input and taking the input question vector corresponding to the input question as the output;
the second model is the neural network model taking the text vector of the candidate question as the input, and taking the candidate question vector corresponding to the candidate question as the output;
the third model is the neural network model taking the text vector of the candidate answer as the input, and taking the candidate answer vector corresponding to the candidate answer as the output; and
a loss function of the joint training is:

$$\text{loss}=(y_{rel}-\text{rel}(vq,va))^2+(y_{sim}-\text{sim}(vq,vq1))^2;$$

where loss is a loss value, $y_{rel}$ is a preset relevance label, $y_{sim}$ is a preset similarity label, rel(vq, va) is the relevance between the input question vector and the candidate answer vector, and sim(vq, vq1) is the similarity between the input question vector and the candidate question vector.

In some embodiments, the first model, the second model, and the third model may all be LSTM models, obviously, models of other configurations may be also selected.

In general, the architecture of the LSTM model can be understood to include an input node, an input gate, an internal state node, a forgetting gate, and an output gate. Where the input node is used for accepting the output of the hidden node at the previous point and the current input as the input, and then passing through an activation function tanh; the input gate plays the role of controlling input information, the input of the input gate is the output of the hidden node at the previous time point and the current input, and the activation function is sigmoid; the input of the internal state node is the current input filtered by the input gate and the output of the internal state node at the previous time point; the forgetting gate plays the role of controlling internal state information, the input of the forgetting gate is the output of the hidden node at the previous time point and the current input, and the activation function is sigmoid; output gate (oc) plays the role of controlling the output information, the input of the gate is the output of the hidden node at the previous time point and the current input, and the activation function is sigmoid.

In the training process of LSTM model, it is essential to update a weight coefficient which includes an input weight, an output weight and the internal state, where the input weight is used to weight the input of the current time step, the output weight is used to weight the output of the last step, and the internal state refers to the use of the internal state in the output calculation of this time step.

By adjusting the above-mentioned weight coefficient based on the value of the loss function, when a certain training condition is satisfied, for example, when a certain number of iterations is reached or the loss function converges, the first model, the second model, and the third model in which training is completed can be obtained.

In the training process, firstly, the already marked training data is provided, and the training data includes the input question, the candidate question and the candidate answer matching the candidate question, where the similarity between the input question and the candidate question at least includes three cases of dissimilarity, partial similarity and very similarity. Accordingly, similarity labels with different values are provided. Illustratively, it can be set as $y_{sim}=1$ representing that the input question and the candidate question are very similar, $y_{sim}=0.5$ representing that the input question and the candidate question are partially similar, and $y_{sim}=0$ representing that the input question and the candidate question are dissimilar. Obviously, the above-mentioned similarity grades and values of the similarity labels are merely exemplary settings in the present embodiment, and in practice, grades in other formats may be set and corresponding similarity labels may be set according to needs.

Similarly, the corresponding relevance grades and values of the relevance labels may also be set according to the relevance between the input question and the candidate answer. In the embodiments, the exemplary relevance grade is set as $y_{rel}=1$ representing that the input question is very relevant to the candidate answer, $y_{rel}=0.5$ representing that the input question is partially relevant to the candidate answer, and $y_{rel}=0$ representing that the input question is not relevant to the candidate answer.

For example, the first model, the second model, and the third model are jointly trained according to the loss function set as described above, for example, the parameters are learned by minimizing the loss function through back propagation and stochastic gradient descent method, and when a certain training condition is satisfied (for example, when the loss function converges or a certain number of iterations are satisfied, etc.), the first model, the second model, and the third model satisfying the use requirements are obtained.

Through joint training, the parameter values in the above models are obtained. The first model, the second model and the third model share the underlying network, for example, capturing the relationship between similarity and relevance through the shared neural network, which reduces the number of parameters of the model and the complexity of the model, and at the same time improves the accuracy of the output results.

Some embodiments of the present disclosure also provide a question-answer processing apparatus.

Figure 6:
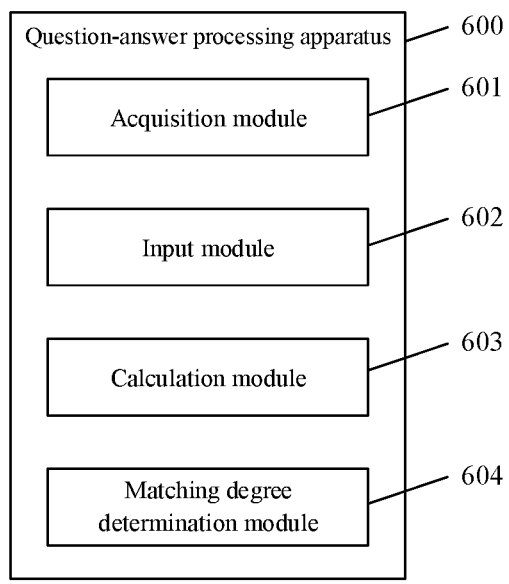
FIG. 6 is a structural diagram of a question-answer processing apparatus in some embodiments of the present disclosure.

As shown in FIG. 6, in one embodiment, the question-answer processing apparatus 600 includes:

an acquisition module 601 configured to acquire the input question and the candidate question-answer pair, where the candidate question-answer pair comprises the candidate question and the candidate answer matching the candidate question;

an input module 602 configured to input the input question into the first model;

a calculation module 603 configured to calculate the similarity between the input question vector and the candidate question vector, and calculating the relevance between the input question vector and the candidate answer vector; and a matching degree determination module 604 configured to determine the matching degree of the candidate answer and the input question according to the similarity and the relevance.

In some of the embodiments, the calculation module 603 is specifically used for:

calculating the similarity between the input question vector and the candidate question vector by the formula 1, where the formula 1 is:

$$sim(vq, vq1) = \frac{vq^T \cdot vq1}{|vq| \times |vq1|},$$

sim(vq, vq1) is the similarity, vq is the input question vector, vq1 is the candidate question vector, $vq^T \cdot vq1$ is the transpose of the input question vector and the dot product of the candidate question vector, |vq| is the length of the input question vector, and |vq1| is the length of the candidate question vector.

In some of the embodiments, the calculation module 603 is specifically used for:

calculating the relevance between the input question vector and the candidate answer vector by the formula 2, where the formula 2 is:

$$rel(vq, va) = \frac{vq^T \cdot va}{|vq| \times |va|},$$

rel(vq, va) is the relevance, vq is the input question vector, va is the candidate answer vector, $vq^T \cdot va$ is the transpose of the input question vector and the dot product of the candidate question vector, |vq| is the length of the input question vector, |va| is the length of the candidate answer vector.

In some of the embodiments, the input module 602 is further used configured to input the candidate question into the second model to obtain the candidate question vector, and inputting the candidate answer into the third model to obtain the candidate answer vector, where the first model, second model and third model are obtained by means of joint training.

Some of the embodiments further include:

a vector input module configured to input the input question, the candidate question and the candidate answer into the shared language model respectively to obtain text vectors respectively corresponding to the input question, the candidate question and the candidate answer;

the input module 602 is specifically used configured to input the text vector corresponding to the input question into the first model; and configured to input the text vector corresponding to the candidate question into the second model; and inputting the text vector corresponding to the candidate answer into the third model.

In some of the embodiments, at least one of the first model, the second model, and the third model is the neural network model.

In some of the embodiments, the shared language model is the Bert model.

Some of the embodiments further include:

a training module configured to acquire the first model, the second model, and the third model by joint training; and the loss function of the joint training being:

$$loss=(y_{rel}-\text{rel}(vq,va))^2+(y_{sim}-\text{sim}(vq,vq1))^2;$$

where loss is the loss value, $y_{rel}$ is the preset relevance label, $y_{sim}$ is the preset similarity label, rel(vq, va) is the relevance between the input question vector and the candidate answer vector, and sim(vq, vq1) is the similarity between the input question vector and the candidate question vector.

In some of the embodiments, the matching degree determination module 604 is specifically used configured to calculate the matching degree of the candidate answer and the input question by the formula 3, where the formula 3 is: score=λ×sim+(1−λ)×relλ; score is the matching degree, sim is the similarity, rel is the relevance, and λ, is the preset coefficient more than 0 and less than 1.

Some of the embodiments further include an output module for outputting the candidate answer of which the matching degree with the input question is more than the preset matching degree threshold.

The embodiments of the present disclosure also provide an electronic device, including a processor, a memory and a computer program stored on the memory and executable on the processor, and when executed by the processor the computer program performs the above-mentioned respective processes of the embodiments of the question-answer processing method, and can achieve the same technical effects, and will not be described in detail herein.

The embodiments of the present disclosure a computer-readable storage medium with the computer program stored thereon, and when executed by the processor, the computer program performs the above-mentioned respective processes of the embodiments of the question-answer processing method, and can achieve the same technical effects, and will not be described in detail herein. Where the computer readable storage medium, such as a Read-Only Memory (ROM), a Random Access Memory (RAM), a magnetic disk or an optical disk, etc.

Those ordinary skilled in the art would recognize that the various illustrative modules, elements, and algorithm steps described in connection with the embodiments disclosed herein can be implemented as electronic hardware, or computer software, or combination of computer software and electronic hardware. Whether such function is executed as hardware or software depends upon the particular application and design constraints imposed on the technical solutions. Those skilled may implement the described function in varying ways for every particular application, but such implementation decisions should not be interpreted as causing a departure from the scope of the present disclosure.

It will be clear to those skilled in the art that, for convenience and brevity of description, reference may be made to the corresponding processes in the above-described method embodiments for the specific workings of the systems, apparatuses and elements described above and will not be described in detail herein.

It should be understood that, although the various steps in the flowcharts of the drawings are shown in order as indicated by the arrows, the steps are not necessarily performed in the order indicated by the arrows. The steps are performed in no strict order unless explicitly stated herein, and may be performed in other orders. Furthermore, at least some of the steps in the flowcharts of the drawings may include sub-steps or stages, which are not necessarily performed at the same time, but may be performed at different times, and are not necessarily performed in order and may be performed in turn or in alternation with at least some of the other steps or sub-steps or stages of other steps.

In the embodiments provided by the present application, it should be understood that the disclosed apparatus and method may be implemented in other ways. For example, the apparatus embodiments described above are merely illustrative, for example, the division of elements is merely a logical function division, and in practice there may be additional divisions, for instance, elements or components may be combined or integrated into another system, or some features may be omitted, or not performed. In another aspect, the couplings or direct couplings or communication connections shown or discussed with respect to every other may be indirect couplings or communication connections through some interface, means, or element, and may be electrical, mechanical, or otherwise.

The elements described as separate elements may or may not be physically separated, and the elements shown as elements may or may not be physical elements, that is, they may be located in one place, or may be distributed over a plurality of network elements. Some or all of the elements may be chosen to achieve the objectives of embodiments of the present disclosure according to actual needs.

In addition, various functional elements in various embodiments of the present disclosure may be integrated in one processing element, may exist physically in a single element, or may be integrated in one element with two or more elements.

The functions, if implemented in the form of software functional elements and sold or used as stand-alone products, may be stored in the computer-readable storage medium. Based on such an understanding, the technical solutions of the present disclosure, either inherently or in any part contributing to the prior art, may be embodied in the form of a software product stored in a storage medium, including instructions that enable a computer device, which may be a personal computer, a server, or a network device, to perform all or part of the steps of the methods described in the various embodiments of the disclosure. Whereas the above-mentioned storage medium includes: various media which can store the program code, such as U-disk, removable hard disk, ROM, RAM, magnetic or optical disk.

The above is only the specific embodiments of the present disclosure, but the protection scope of the present disclosure is not limited to this. Any person skilled in the technical field can easily think of changes or replacements within the technical scope disclosed in the present disclosure, which should be covered by the protection scope of the present disclosure. Therefore, the scope of protection of the present disclosure shall be subject to the scope of protection of the claims.

What is claimed is:

1. A question-answer processing method, comprising:

acquiring an input question and a candidate question-answer pair, wherein the candidate question-answer pair comprises a candidate question and a candidate answer matching the candidate question;

inputting the input question into a first model to obtain an input question vector;

calculating a similarity between the input question vector and a candidate question vector, and calculating a relevance between the input question vector and a candidate answer vector, wherein the candidate question vector is a vector corresponding to the candidate question, and the candidate answer vector is a vector corresponding to the candidate answer; and determining a matching degree of the candidate answer and the input question according to the similarity and the relevance;

wherein the calculating the relevance between the input question vector and the candidate answer vector comprises:

calculating the relevance between the input question vector and the candidate answer vector by a formula 2, wherein the formula 2 is:

$$rel(vq, va) = \frac{vq^T \cdot va}{|vq| \times |va|},$$

rel(vq, va) is the relevance, vq is the input question vector, va is the candidate answer vector, $vq^T \cdot va$ is the transpose of the input question vector and the dot product of the candidate question vector, |vq| is the length of the input question vector, |va| is the length of the candidate answer vector.

2. The method according to claim 1, wherein the calculating the similarity between the input question vector and the candidate question vector comprises:

calculating the similarity between the input question vector and the candidate question vector by a formula 1, wherein the formula 1 is:

$$sim(vq, vq1) = \frac{vq^T \cdot vq1}{|vq| \times |vq1|},$$

sim(vq, vq1) is the similarity, vq is the input question vector, vq1 is the candidate question vector, $vq^T \cdot vq1$ is a transpose of the input question vector and a dot product of the candidate question vector, |vq| is a length of the input question vector, and |vq1| is the length of the candidate question vector.

3. The method according to claim 1, wherein the question-answer processing method further comprises:

inputting the candidate question into a second model to obtain the candidate question vector, and inputting the candidate answer into a third model to obtain the candidate answer vector, wherein the first model, second model and third model are obtained by means of joint training.

4. The method according to claim 3, wherein after the acquiring the input question and the candidate question-answer pair further comprises:

inputting the input question, the candidate question and the candidate answer into a shared language model respectively to obtain text vectors respectively corresponding to the input question, the candidate question and the candidate answer;

inputting the input question into the first model, comprising:

inputting a text vector corresponding to the input question into the first model;

inputting the candidate question into the second model, comprising:

inputting the text vector corresponding to the candidate question into the second model; and inputting the candidate answer into the third model, comprising:

inputting the text vector corresponding to the candidate answer into the third model.

5. The method according to claim 3, wherein at least one of the first model, the second model, and the third model is a neural network model.

6. The method according to claim 4, wherein the shared language model is a Bert model.

7. The method according to claim 3, wherein the method further comprises:

acquiring the first model, the second model, and the third model by joint training; and a loss function of the joint training being:

$$loss = (y_{rel} - rel(vq, va))^2 + (y_{sim} - sim(vq, vq1))^2;$$

wherein loss is a loss value, $y_{rel}$ is a preset relevance label, $y_{sim}$ is a preset similarity label, rel(vq, va) is the relevance between the input question vector and the candidate answer vector, and sim(vq, vq1) is the similarity between the input question vector and the candidate question vector.

8. The method according to claim 1, wherein the determining the matching degree of the candidate answer and the input question according to the similarity and the relevance comprises:

calculating the matching degree of the candidate answer and the input question by a formula 3, wherein the formula 3 is: score=λ×sim+(1−λ)×rel λ; score is the matching degree, sim is the similarity, rel is the relevance, and λ is a preset coefficient more than 0 and less than 1.

9. The method according to claim 1, wherein after the determining the matching degree of the candidate answer and the input question according to the similarity and the relevance, further comprises:

outputting the candidate answer of which the matching degree with the input question is larger than a preset matching degree threshold.

10. An electronic device, comprising a processor, a memory and a computer program stored on the memory and executable on the processor, wherein the computer program is executed by the processor to perform:

acquiring an input question and a candidate question-answer pair, wherein the candidate question-answer pair comprises a candidate question and a candidate answer matching the candidate question;

inputting the input question into a first model to obtain an input question vector;

calculating a similarity between the input question vector and a candidate question vector, and calculating a relevance between the input question vector and a candidate answer vector, wherein the candidate question vector is a vector corresponding to the candidate question, and the candidate answer vector is a vector corresponding to the candidate answer; and determining a matching degree of the candidate answer and the input question according to the similarity and the relevance;

wherein the computer program is executed by the processor to perform:

calculating the relevance between the input question vector and the candidate answer vector by a formula 2, wherein the formula 2 is:

$$rel(vq, va) = \frac{vq^T \cdot va}{|vq| \times |va|},$$

rel(vq, va) is the relevance, vq is the input question vector, va is the candidate answer vector, $vq^T \cdot va$ is the transpose of the input question vector and the dot product of the candidate question vector, |vq| is the length of the input question vector, |va| is the length of the candidate answer vector.

11. The electronic device according to claim 10, wherein the computer program is executed by the processor to perform:
   calculating the similarity between the input question vector and the candidate question vector by a formula 1, wherein the formula 1 is:

$$sim(vq, vq1) = \frac{vq^T \cdot vq1}{|vq| \times |vq1|},$$

sim(vq, vq1) is the similarity, vq is the input question vector, vq1 is the candidate question vector, $vq^T \cdot vq1$ is a transpose of the input question vector and a dot product of the candidate question vector, |vq| is a length of the input question vector, and |vq1| is the length of the candidate question vector.

12. The electronic device according to claim 10, wherein the computer program is executed by the processor to perform:
   inputting the candidate question into a second model to obtain the candidate question vector, and inputting the candidate answer into a third model to obtain the candidate answer vector, wherein the first model, second model and third model are obtained by means of joint training.

13. The electronic device according to claim 12, wherein after the acquiring the input question and the candidate question-answer pair, the computer program is executed by the processor to perform:
   inputting the input question, the candidate question and the candidate answer into a shared language model respectively to obtain text vectors respectively corresponding to the input question, the candidate question and the candidate answer;
   inputting the input question into the first model, comprising:
   inputting a text vector corresponding to the input question into the first model;
   inputting the candidate question into the second model, comprising:
   inputting the text vector corresponding to the candidate question into the second model; and
   inputting the candidate answer into the third model, comprising:
   inputting the text vector corresponding to the candidate answer into the third model.

14. The electronic device according to claim 12, wherein at least one of the first model, the second model, and the third model is a neural network model.

15. The electronic device according to claim 13, wherein the shared language model is a Bert model.

16. The electronic device according to claim 12, wherein the computer program is executed by the processor to perform:
   acquiring the first model, the second model, and the third model by joint training; and
   a loss function of the joint training being:

$$loss = (y_{rel} - rel(vq, va))^2 + (y_{sim} - sim(vq, vq1))^2;$$

wherein loss is a loss value, $y_{rel}$ is a preset relevance label, $y_{sim}$ is a preset similarity label, rel(vq, va) is the relevance between the input question vector and the candidate answer vector, and sim(vq, vq1) is the similarity between the input question vector and the candidate question vector.

17. The electronic device according to claim 10, wherein the computer program is executed by the processor to perform:
   calculating the matching degree of the candidate answer and the input question by a formula 3, wherein the formula 3 is: score=λ×sim+(1−λ)×rel λ; score is the matching degree, sim is the similarity, rel is the relevance, and λ is a preset coefficient more than 0 and less than 1.

18. The electronic device according to claim 10, wherein after the determining the matching degree of the candidate answer and the input question according to the similarity and the relevance, the computer program is executed by the processor to perform:
   outputting the candidate answer of which the matching degree with the input question is larger than a preset matching degree threshold.

* * * * *